Patented Jan. 16, 1951

2,538,254

UNITED STATES PATENT OFFICE 2,538,254

KETONE PLASTICIZERS FOR POLYVINYL CHLORIDE RESINS

Robert J. Lee, La Marque, Tex., and Robert H. Reiff, New Cumberland, Pa., assignors to Pan American Refining Corporation, Texas City, Tex., a corporation of Delaware No Drawing. Application August 6, 1947, Serial No. 766,878

13 Claims. (Cl. 260—31.8)

This invention relates to a method of plasticizing polyvinyl halide resins and to the products produced by said method. More particularly this invention relates to a method of plasticizing and increasing the thermal stability of polyvinyl chloride resins, and the products produced thereby.

High molecular weight polyvinyl chloride resins require plasticization and thermal stabilization. The need for plasticization is due to the inherent stiffness or brittleness of polyvinyl chloride resins. The need for thermal stabilization is due to the fact that at high temperatures above about 200° F., polyvinyl chloride resins tend to disengage hydrogen chloride which causes corrosion of various metal surfaces upon which the polyvinyl chloride is coated, by baking or otherwise. Also, at high temperatures polyvinyl chloride resins darken notably. By the term "thermal stabilization" as used herein, it is intended to denote the process of preventing or inhibiting the darkening of polyvinyl chloride resins and inhibiting metal corrosion by said resins at high temperatures.

Numerous plasticizers have heretofore been proposed for use in polyvinyl chloride resins including alkyl diesters of phthalic acid, such as dibutyl phthalates and dioctyl phthalates. The use of these plasticizers has not, however, served to produce thermally stable polyvinyl chloride resins and it was heretofore necessary to add basic materials capable of combining with the hydrogen chloride generated from the polyvinyl chloride resins at high temperatures to prevent corrosion of metal surfaces upon which the polyvinyl chloride resins were coated. A variety of basic materials have been proposed including for example, basic lead stearate, which is a mixture of a lead oxide and lead stearate.

The polyvinyl halide resins to which reference has been made above include not only high molecular weight polyvinyl chloride resins per se but resinous copolymerization products containing polyvinyl chlorides, particularly polyvinyl chloride-acetate copolymers containing between about 80 and about 95 per cent by weight of polyvinyl chloride and the remainder polyvinyl acetate, said resins having molecular weights between about 5,000 and about 25,000 as determined by the Staudinger viscosity method.

This invention has particular reference to the plasticization and thermal stabilization of polyvinyl chloride-acetate copolymers known in commerce as Vinylite VYNW which contain 93–95 per cent of vinyl chloride and 7–5 per cent of vinyl acetate and have an average molecular weight of about 24,000 (J. P. Mason and J. F. Manning, "The Technology of Plastics and Resins" (1945), page 285).

We have found that the plasticization and thermal stabilization of a polyvinyl halide resin such as Vinylite VYNW can be effected by incorporating therein a plasticizing proportion of phenyl naphthyl ketone, particularly a phenyl dimethylnaphthyl ketone. We have also discovered that an alkyl diester of phthalic acid cooperates synergistically with a phenyl naphthyl ketone and reduces the corrosive tendencies and darkening encountered at high temperatures with a polyvinyl chloride resin, as will be set forth in more detail hereinafter.

In the examples described below we have employed phenyl methylnaphthyl ketones prepared by the reaction of benzoyl chloride with a fraction of hydroformer bottoms containing a substantial proportion of mono-, di-, and trimethylnaphthalenes. A typical hydroformer bottoms fraction as employed by us boils between about 450 and 560° F. at atmospheric pressure and may contain 60–85 volume per cent mono-, di-, and trimethylnaphthalenes of which 25–50 volume per cent may be dimethylnaphthalenes. Hydroformer bottoms are produced by a process in which petroleum naphtha, which may be a virgin or cracked naphtha or mixture of both, is converted to aromatic hydrocarbons by contacting with a solid, porous dehydrogenation catalyst at a temperature in the range of about 850° F. to about 1050° F., preferably in the presence of hydrogen. Suitable catalysts are oxides of metals of groups 2 to 6 of the periodic system, particularly oxides of 6th group metals such as chromium and molybdenum, preferably supported by alumina or magnesia. Excellent catalysts can be prepared by depositing about 4 to about 10% of molybdena upon an activated alumina. Suitable space velocities of hydroforming fall within the range of about 0.2 to about 4 volumes of the liquid charge stock per hour per volume of catalyst space. About 0.5 to about 8 mols of hydrogen can be charged to the process with each mol of naphtha feed stock. In addition to a high octane number of naphtha, the hydroforming process produces a fraction which boils above the naphtha range which is known as hydroformer bottoms.

The phenyl methylnaphthyl ketones can be prepared by slowly adding 19.2 mols benzoyl chloride to 38 mols of a hydroformer bottoms fraction of 450–560° F. boiling range (calculated on the basis of a molecular weight corresponding to dimethylnaphthalenes) and 21.2 mols of anhydrous aluminum chloride. The temperature is maintained between about 32° F. and about 41° F. during the addition of the benzoyl chloride. Upon completion of the reaction the reaction mixture is hydrolyzed and extracted with benzene. The phenyl dimethylnaphthyl ketone is produced in about 68 per cent of the theoretical yield. The phenyl methyl naphthyl ketones so prepared are a mixture of the phenyl (monomethyl-, dimethyl-, and trimethyl-naphthyl) ketones and contain a substantial proportion of phenyl dimethylnaphthyl ketone. This product is a light yellow, viscous oil with little or no odor and boils between about 383° F. and 406° F. under the pressure of 2 mm. of mercury. The higher boiling portions of the product have a high refractive index (1.700) and contain some dibenzoyl dimethylnaphthalenes. The physical properties of the phenyl naphthyl ketones prepared by the above described procedure are set forth in Table I.

TABLE I

*Physical properties of phenyl dimethylnaphthyl ketones (benzoylated hydroformer bottoms)*

| | |
|---|---|
| Boiling range | 383–406° F. at 2 mm. Hg |
| ASTM color | 2 |
| Corrosion (copper strip, ½ hr.) | O. K. |
| Pour point | 75° F. |
| Flash point | 410° F. |
| Fire point | 490° F. |
| Viscosity | 1070 centipoises at 100° F. 4550 S. S. U. at 100° F. |
| Refractive index ($n_D^{25}$) | 1.6363 |
| Gravity | 1.088/60° F. |
| Odor | Practically none |

Table II presents the results of tests made on Vinylite VYNW containing plasticizers as indicated, cut into 1″ x 5″ strips (1/16 inch thick) as described in ASTM test D742–44T, "Weight loss on heating—non-rigid vinyls" (ASTM Standards, vol. III, page 1517 (1944)). The strips were weighed and placed on terneplated steel sheets in an electric natural air-draft oven heated to 212° F. The strips were heated at 212° F. for 48 hours and were then turned over and allowed to remain in the oven at that temperature for an additional 48 hours. The samples were then cooled to room temperature, reweighed and the per cent loss in weight was calculated by dividing the actual weight loss X 100 by the original weight of the sample.

The flexibility data shown in the following table were obtained by bending the plastic test strip into a roughly circular form by bringing the two free ends in contact, placing the "wheel" in a vertical position on a flat surface, releasing the strip and then noting the approximate time required for the plastic to return to its original horizontal form. The rating scale involves numbers 1 to 4. A rating of 1 indicates a very rapid return of the bent strip to the horizontal position. A rating of 4 indicates that the test strip is almost rigid.

In the method of rating color of the test strips, the lightest color was rated 1 and progressively darker colors were rated higher numbers up to 10. Corrosion was rated, like color, in the following table by a scale of numerical values wherein the higher values represent the most corrosion.

TABLE II

*Heat aging tests on plasticized vinylite VYNW sheets*

| | Parts by weight |
|---|---|
| Vinylite VYNW | 100 |
| "V–1–N" (addition agent for vinyl chloride plastics marketed by Advance Solvents and Chemicals Corp., New York city) | 3 |
| Stearic acid | 1 |
| Plasticizers | As indicated |

Oven aged 96 hours at 212° F.

| Ex. No. | Dioctyl Phthalate | Phenyl Dimethyl Naphthyl Ketones | Percent Loss in Weight Found | Relative Flexibility of aged Plastic | Relative Color of aged Plastic | Relative Corrosion of Terneplate Strips in Contact with Plastic |
|---|---|---|---|---|---|---|
| 1 | 50 | | 1.7 | Best | 4 | 5 (Considerable). |
| 2 | | 50 | 9.1 | 4 | Black | 3 (Trace). |
| 3 | 17.5 | 32.5 | 6.5 | 3 | 1 | 1 (None). |
| 4 | 32.5 | 17.5 | 4.8 | 1 | 3 | 2 (Slight). |

It will be observed that although the dioctyl phthalate was a good plasticizer considerable corrosion of the terneplated steel strip occurred and that the plasticized resin darkened considerably upon subjection to the elevated temperature, as set forth in Example 1. The employment of phenyl dimethylnaphthyl ketones alone resulted in a considerably reduced amount of corrosion, but the plasticized resin turned black, as set forth in Example 2. Example 3 shows that the employment of 65 weight per cent of phenyl dimethylnaphthyl ketones and 35 per cent of dioctyl phthalates as plasticizers resulted in a resin which exhibited practically no corrosion and retained a light color after aging. Example 4, in which the reverse ratios of plasticizing components were used as compared with Example 3, resulted in a resin which exhibited slight corrosion and poorer color than the resin in Example 3. However, the stabilization obtained in Example 4 was greater than that obtained in Examples 1 and 2.

It will be understood that our invention is illustrated, but not limited by the examples set forth above. Thus, although the examples describe the use of 50 weight per cent of plasticizer based on the polyvinyl chloride resin, we may employ between about 15 and about 100 per cent by weight of plasticizers comprising a phenyl naphthyl ketone alone or with an alkyl diester of phthalic acid. We prefer to employ mixtures of plasticizers containing at least about 35 per cent by weight of the phenyl naphthyl ketone, especially about 50 to about 75 per cent by weight, the remainder being essentially an alkyl diester of phthalic acid.

We may also employ phenyl naphthyl ketones containing various other substituents in the naphthyl and/or phenyl nucleus, for example alkyl groups, halogens and the like. Instead of dioctyl phthalate, we may employ other alkyl diesters of phthalic acid, such as dibutyl phthalates, and the like.

Having thus described our invention, what we claim is:

1. The method of plasticizing and thermally stabilizing polyvinyl chloride resin which comprises incorporating therein between about 15 and 100 weight percent, based on said resin, of a mixture containing about 50 to about 75 percent of a phenyl naphthyl ketone selected from the group consisting of unsubstituted phenyl naphthyl ketones and unsubstituted phenyl methylnaphthyl ketones and about 50 to about 25 percent of a dioctyl phthalate.

2. The method of plasticizing and thermally stabilizing polyvinyl chloride-acetate copolymer resin containing about 80 to about 95 percent of copolymerized polyvinyl chloride and about 20 to about 5 percent of copolymerized polyvinyl acetate, which method comprises incorporating in said resin between about 15 and about 100 weight percent, based on said resin, of a mixture containing about 65 percent of phenyl dimethylnaphthyl ketone and about 35 percent of dioctyl phthalate.

3. A polyvinyl chloride-acetate copolymer resin of improved color stability and reduced corrosion tendencies containing between about 80 and about 95 percent of copolymerized vinyl chloride and about 20 to about 5 percent of copolymerized vinyl acetate and between about 15 and about 100 weight percent, based on said resin, of a mixture containing between about 50 and about 75 percent of a phenyl naphthyl ketone selected from the group consisting of unsubstituted phenyl naphthyl ketones and unsubstituted phenyl methylnaphthyl ketones and about 50 to about 25 percent of dioctyl phthalate.

4. A polyvinyl chloride-acetate copolymer resin of improved color stability and reduced corrosion tendencies containing about 95 per cent of polyvinyl chloride and about 5 per cent of copolymerized vinyl acetate and between about 15 and about 100 weight percent, based on said resin, of a mixture containing about 65 per cent of phenyl dimethylnaphthyl ketone and about 35 per cent of dioctyl phthalate.

5. Polyvinyl chloride resin of reduced corrosion tendencies comprising between about 15 and about 100 weight percent, based on said resin, of a phenyl naphthyl ketone selected from the group consisting of unsubstituted phenyl naphthyl ketones and unsubstituted phenyl methylnaphthyl ketones.

6. Polyvinyl chloride resin of reduced corrosion tendencies comprising between about 15 and about 100 weight percent, based on said resin, of an unsubstituted phenyl methylnaphthyl ketone.

7. Polyvinyl chloride resin of reduced corrosion tendencies comprising between about 15 and about 100 weight percent, based on said resin, of an unsubstituted phenyl dimethylnaphthyl ketone.

8. Polyvinyl chloride-acetate copolymer resin of reduced corrosion tendencies containing between about 80 and about 95 percent of polyvinyl chloride and between about 20 and about 5 percent of polyvinyl acetate, said resin comprising between about 15 and about 100 percent by weight, based on said resin, of a phenyl naphthyl ketone selected from the group consisting of unsubstituted phenyl naphthyl ketones and unsubstituted phenyl methylnaphthyl ketones.

9. Polyvinyl chloride-acetate copolymer resin of reduced corrosion tendencies containing between about 80 and about 95 percent of polyvinyl chloride and between about 20 and about 5 percent of polyvinyl acetate, said resin comprising between about 15 and about 100 percent by weight, based on said resin, of an unsubstituted phenyl methylnaphthyl ketone.

10. Polyvinyl chloride-acetate copolymer resin of reduced corrosion tendencies containing between about 80 and about 95 percent of polyvinyl chloride and between about 20 and about 5 percent of polyvinyl acetate, said resin comprising between about 15 and about 100 percent by weight, based on said resin, of an unsubstituted phenyl dimethylnaphthyl ketone.

11. Polyvinyl chloride-acetate copolymer resin of improved color stability and reduced corrosion tendencies containing between about 80 and about 95 percent of polyvinyl chloride and between about 20 and about 5 percent of polyvinyl acetate, said resin comprising between about 15 and about 100 percent by weight, based on said resin, of a mixture containing between about 50 and about 75 percent of an unsubstituted phenyl methylnaphthyl ketone and between about 50 and about 25 percent of an octyl diester of phthalic acid.

12. Polyvinyl chloride-acetate copolymer resin of improved color stability and reduced corrosion tendencies containing between about 80 and about 95 percent of polyvinyl chloride and between about 20 and about 5 percent of polyvinyl acetate, said resin comprising between about 15 and about 100 percent by weight, based on said resin, of a mixture containing between about 50 and about 75 percent of an unsubstituted phenyl dimethylnaphthyl ketone and between about 50 and about 25 percent of an octyl diester of phthalic acid.

13. A resin of reduced corrosion tendencies selected from the group consisting of polyvinyl chloride resin and polyvinyl chloride-acetate copolymer resin containing between about 80 and about 95 percent of polyvinyl chloride and between about 20 and about 5 percent of polyvinyl acetate, said resin comprising between about 15 and about 100 percent by weight, based on said resin, of a phenyl naphthyl ketone selected from the group consisting of unsubstituted phenyl naphthyl ketones and unsubstituted phenyl methylnaphthyl ketones.

ROBERT J. LEE.
ROBERT H. REIFF.

REFERENCES CITED

The following references are of record in the file of this patent:

UNITED STATES PATENTS

| Number | Name | Date |
| --- | --- | --- |
| 2,099,441 | Heckert | Nov. 16, 1937 |
| 2,371,134 | Gusham | Mar. 13, 1945 |
| 2,427,513 | Spessard | Sept. 16, 1947 |

FOREIGN PATENTS

| Number | Country | Date |
| --- | --- | --- |
| 518,027 | Great Britain | Feb. 15, 1940 |